United States Patent
Zelisko et al.

(10) Patent No.: US 10,919,241 B2
(45) Date of Patent: Feb. 16, 2021

(54) SELF-HEALING SILOXANE ELASTOMERS

(71) Applicant: Brock University, St. Catharines (CA)

(72) Inventors: Paul M. Zelisko, St. Catharines (CA); Amin Nasresfahani, St. Catharines (CA)

(73) Assignee: Brock University, St. Catharines (CA)

( * ) Notice: Subject to any disclaimer, the term of this patent is extended or adjusted under 35 U.S.C. 154(b) by 4 days.

(21) Appl. No.: 16/381,241

(22) Filed: Apr. 11, 2019

(65) Prior Publication Data

US 2019/0315934 A1 Oct. 17, 2019

Related U.S. Application Data

(60) Provisional application No. 62/656,004, filed on Apr. 11, 2018.

(51) Int. Cl.

| | | |
|---|---|---|
| *B29C 73/16* | (2006.01) | |
| *C08L 83/08* | (2006.01) | |
| *C08J 3/24* | (2006.01) | |
| *C08L 83/04* | (2006.01) | |
| *C08G 77/38* | (2006.01) | |
| *C08G 77/04* | (2006.01) | |
| *C08G 77/388* | (2006.01) | |
| *C08G 77/14* | (2006.01) | |

(52) U.S. Cl.
CPC .......... *B29C 73/163* (2013.01); *C08G 77/045* (2013.01); *C08G 77/38* (2013.01); *C08J 3/246* (2013.01); *C08L 83/04* (2013.01); *C08G 77/14* (2013.01); *C08G 77/388* (2013.01); *C08J 2383/04* (2013.01); *C08L 2205/025* (2013.01); *C08L 2205/04* (2013.01); *C08L 2205/05* (2013.01); *C08L 2312/02* (2013.01)

(58) Field of Classification Search
None
See application file for complete search history.

(56) References Cited

PUBLICATIONS

A. Gandini, D. Coelho and A. J. D. Silvestre, Eur. Polym. J., 2008, 44, 4029-4036.
C. Gaina, O. Ursache and V. Gaina, Polym. Plast. Technol. Eng., 2011, 50, 712-718.
C. Goussé and A. Gandini, Polym. Int., 1999, 48, 723-731.
A. Nasresfahani and Paul M. Zelisko. Polym. Chem. 2017, 8: 2942-2952.
N. K. Guimard, K. K. Oehlenschlaeger, J. Zhou, S. Hilf, F. G. Schmidt and C. Barner-Kowollik, Macromol. Chem. Phys., 2012, 213, 131-143.
S. Schäfer and G. Kickelbick, Polymer, 2015, 69, 357-368.
X.-Y. Jia, J.-F. Mei, J.-C. Lai, C.-H. Li and X.-Z. You, Chem. Commun., 2015, 51, 8928-8930.
X. Jia, J. Mei, J. Lai, C. Li and X. You, Macromol. Rapid Commun., 2016, 37, 952-956.
Y. Yang, X. Ding and M. W. Urban, Prog. Polym. Sci., 2015, 49-50, 34-59.
S. Yu, R. Zhang, Q. Wu, T. Chen and P. Sun, Adv. Mater., 2013, 25, 4912-4917.
P. M. Zelisko, H. Y. Amarne, A. D. Bain and K. Neumann, J. Chem. Educ., 2008, 85, 104.
A. Gandini, Prog. Polym. Sci., 2013, 38, 1-29.
M. A. Tasdelen, Polym. Chem., 2011, 2, 2133.
Y.-L. Liu and T.-W. Chuo, Polym. Chem., 2013, 4, 2194.
E. Trovatti, T. M. Lacerda, A. J. F. Carvalho and A. Gandini, Adv. Mater., 2015, 27, 2242-2245.
T. Engel and G. Kickelbick, in Self-Healing Polymers, Wiley-VCH Verlag GmbH & Co. KGaA, Weinheim, Germany, 2013, pp. 153-171.
A. Sanyal, Macromol. Chem. Phys., 2010, 211, 1417-1425.
P. A. Pratama, M. Sharifi, A. M. Peterson and G. R. Palmese, ACS Appl. Mater. Interfaces, 2013, 5, 12425-12431.
P. M. Imbesi, C. Fidge, J. E. Raymond, S. I. Cauët and K. L. Wooley, ACS Macro Lett., 2012, 1, 473-477.
N. Yoshie, M. Watanabe, H. Araki and K. Ishida, Polym. Degrad. Stab., 2010, 95, 826-829.
F. Yu, X. Cao, J. Du, G. Wang and X. Chen, ACS Appl. Mater. Interfaces, 2015, 7, 24023-24031.
T. N. Gevrek, M. Arslan and A. Sanyal, in Functional Polymers by Post-Polymerization Modification, Wiley-VCH Verlag GmbH & Co. KGaA, Weinheim, Germany, 2013, pp. 119-151.
V. Froidevaux, M. Borne, E. Laborbe, R. Auvergne, A. Gandini and B. Boutevin, RSC Adv., 2015, 5, 37742-37754.
J. Canadell, H. Fischer, G. De With and R. A. T. M. van Bentham, J. Polym. Sci. Part A Polym. Chem., 2010, 48, 3456-3467.
E. Goiti, M. B. Huglin and J. M. Rego, Macromol. Rapid Commun., 2003, 24, 692-696.
R. Araya-Hermosilla, G. Fortunato, A. Pucci, P. Raffa, L. Polgar, A. A. Broekhuis, P. Pourhossein, G. M. R. Lima, M. Beljaars and F. Picchioni, Eur. Polym. J., 2016, 74, 229-240.
T. Engel and G. Kickelbick, Chem. Mater., 2013, 25, 149-157.
C. Zeng, H. Seino, J. Ren, K. Hatanaka and N. Yoshie, Polymer, 2013, 54, 5351-5357.
T. Engel and G. Kickelbick, Eur. J. Inorg. Chem., 2015, 2015, 1226-1232.
C. Zeng, H. Seino, J. Ren, K. Hatanaka and N. Yoshie, Macromolecules, 2013, 46, 1794-1802.
Y. Yang and M. W. Urban, Chem. Soc. Rev., 2013, 42, 7446.
S. J. Garcia, Eur. Polym. J., 2014, 53, 118-125.
J. Zhao, R. Xu, G. Luo, J. Wu and H. Xia, J. Mater. Chem. B, 2016, 4, 982-989.
L. M. Polgar, M. Van Duin, A. A. Broekhuis and F. Picchioni, Macromolecules, 2015, 48, 7096-7105.
Y. Heo and H. A. Sodano, Adv. Funct. Mater., 2014, 24, 5261-5268.
E. Goiti, M. B. Huglin and J. M. Rego, Polymer, 2001, 42, 10187-10193.

(Continued)

*Primary Examiner* — Marc S Zimmer

(74) *Attorney, Agent, or Firm* — Bereskin & Parr LLP/S.E.N.C.R.L., s.r.l.; Michael Fenwick

(57) ABSTRACT

The present disclosure relates to self-healing siloxane elastomers. In particular, the present disclosure relates to self-healing siloxane elastomers comprising at least one siloxane polymer reversibly crosslinked to a second siloxane oligomer or polymer.

15 Claims, 7 Drawing Sheets

(56) References Cited

PUBLICATIONS

K. Roos, E. Dolci, S. Carlotti and S. Caillol, Polym. Chem., 2016, 7, 1612-1622.
C.-I. Chou and Y.-L. Liu, J. Polym. Sci. Part A Polym. Chem., 2008, 46, 6509-6517.
Y. Imai, H. Itoh, K. Naka and Y. Chujo, Macromolecules, 2000, 33, 4343-4346.
C. Vilela, L. Cruciani, A. J. D. Silvestre and A. Gandini, RSC Adv., 2012, 2, 2966.
S. H. Cho, H. M. Andersson, S. R. White, N. R. Sottos and P. V. Braun, Adv. Mater., 2006, 18, 997-1000.
M. D. Hager, P. Greil, C. Leyens, S. van der Zwaag and U. S. Schubert, Adv. Mater., 2010, 22, 5424-5430.
M. W. Keller, S. R. White and N. R. Sottos, Adv. Funct. Mater., 2007, 17, 2399-2404.
R. Gheneim, C. Perez-Berumen and A. Gandini, Macromolecules, 2002, 35, 7246-7253.
Z. Xu, Y. Zhao, X. Wang and T. Lin, Chem. Commun., 2013, 49, 6755.
H. Zhou, Q. Ye and J. Xu, Mater. Chem. Front., 1:212, 2017.
D. R. Paul and J. E. Mark, Prog. Polym. Sci., 2010, 35, 893-901.
K. Pielichowski, J. Njuguna, B. Janowski and J. Pielichowski, in Advances in Polymer Science, 2006, vol. 201, pp. 225-296.
J. O. Park and S. H. Jang, J. Polym. Sci. Part A Polym. Chem., 1992, 30, 723-729.
C. B. Patel, N. I. Malek and S. L. Oswal, J. Macromol. Sci. Part A, 2006, 43, 289-303.
Y. Zhang, A. A. Broekhuis and F. Picchioni, Macromolecules, 2009, 42, 1906-1912.
J. P. Swanson, S. Rozvadovsky, J. E. Seppala, M. E. Mackay, R. E. Jensen and P. J. Costanzo, Macromolecules, 2010, 43, 6135-6141.
H. Laita, S. Boufi and a. Gandini, Eur. Polym. J., 1997, 33, 1203-1211.
S. A. Canary and M. P. Stevens, J. Polym. Sci. Part A Polym Chem., 1992, 30, 1755-1760.

SELF-HEALING SILOXANE ELASTOMERS

CROSS-REFERENCE TO RELATED APPLICATIONS

The present application claims the benefit of priority from U.S. provisional application No. 62/656,004 filed on Apr. 11, 2018, the contents of which is incorporated herein by reference in their entirety.

FIELD

The present disclosure relates to self-healing siloxane elastomers. In particular, the present disclosure relates to self-healing siloxane elastomers comprising at least one siloxane polymer reversibly crosslinked to a second siloxane oligomer or polymer.

INTRODUCTION

Self-healing polymers are a class of smart materials capable of responding to a specific stimulus, commonly thermal and mechanical energies, to heal damaged areas through a chemical reaction or physical interaction.[1] Polymeric materials are susceptible to damage over the course of their lifetime. As a result, engineered materials have been developed with the aim of damage suppression/management in order to extend the lifetime and reliability of synthetic materials. Cross-linking is often employed as a means of enhancing the physical and mechanical properties of polymers. Compared to thermoplastics, which are not chemically cross-linked, thermoset materials can have higher durability, extended lifetimes, greater solvent resistance, and dimensional stability.

SUMMARY

The present disclosure relates to self-healing siloxane elastomers. In particular, the present disclosure relates to self-healing siloxane elastomers comprising at least one siloxane polymer reversibly crosslinked to a second siloxane oligomer or polymer.

Accordingly, in one embodiment of the disclosure there is included a siloxane elastomer, comprising:
  at least one siloxane polymer which is functionalized with a first Diels-Alder moiety; and
    wherein the at least one siloxane polymer is cross-linked with at least one second siloxane oligomer or polymer which is functionalized with two or more of a second Diels-Alder moiety,
    wherein the first and second Diels-Alder moieties form reversible cross-links.

The siloxane elastomers of the present disclosure are capable of responding to external stimuli, such as thermal and mechanical energies, to heal damaged areas through the reversible cross-links between the siloxane polymers.

Other features and advantages of the present application will become apparent from the following detailed description. It should be understood, however, that the detailed description and the specific examples while indicating preferred embodiments of the application are given by way of illustration only, since various changes and modifications within the spirit and scope of the application will become apparent to those skilled in the art from this detailed description.

BRIEF DESCRIPTION OF THE DRAWINGS

The present disclosure will now be described in greater detail with reference to the drawings in which.

DESCRIPTION OF VARIOUS EMBODIMENTS

Definitions

Figure 1:
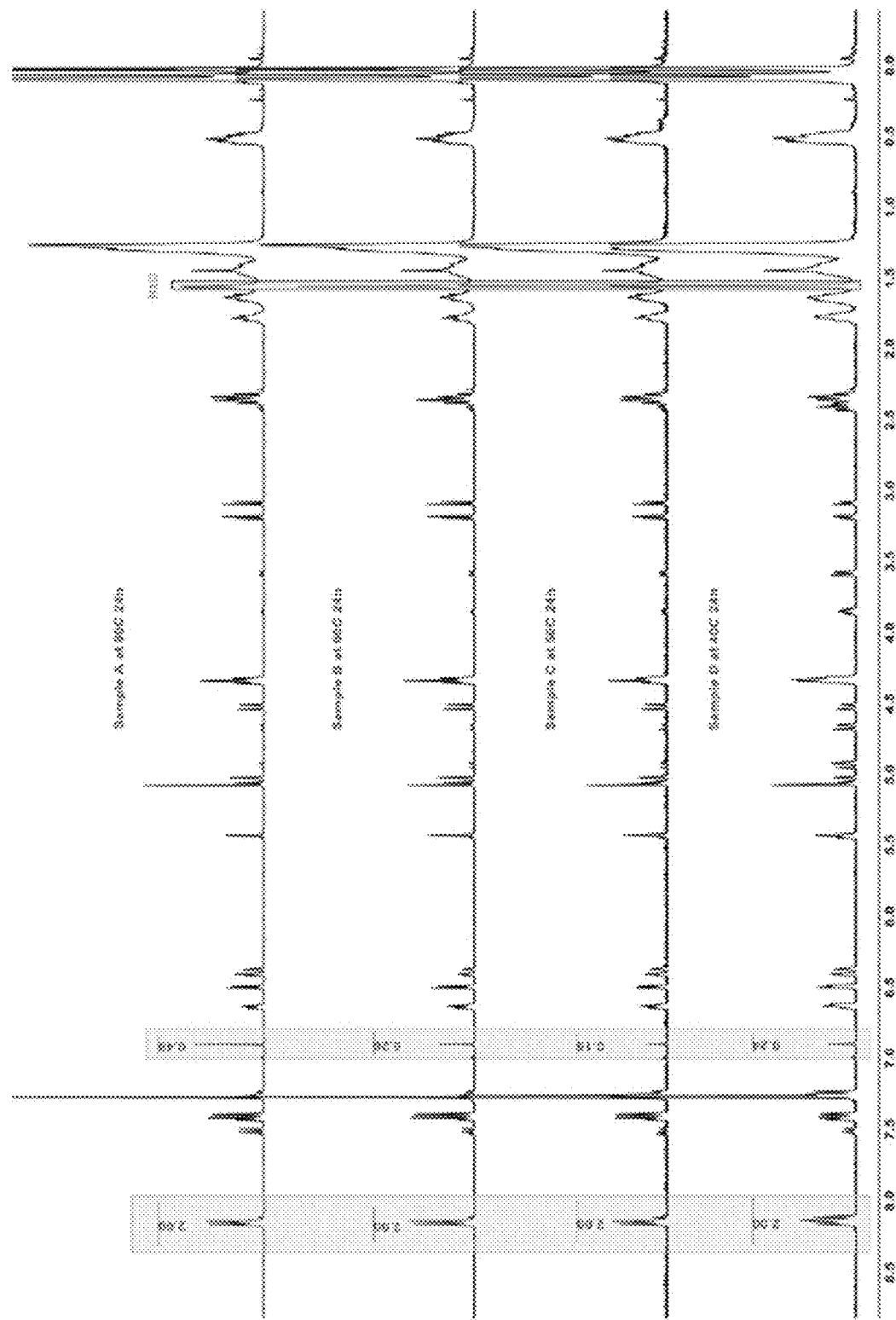
FIG. 1 shows $^1$HNMR spectra of crosslinked monomers.

The term "siloxane elastomer" as used herein refers to a siloxane polymer exhibiting elastic properties.

The term "siloxane polymer" as used herein refers to an organo-silicon polymer which comprises Si—O—Si linkages as the backbone of the polymer.

The term "cyclic siloxane" as used herein refers to an organosilicon compound comprising a suitable cyclic moiety of the structure $[-Si-OH]_n$.

The term "polyhedral siloxane" as used herein refers to a siloxane which has a three dimensional or "cage" structure.

The term "polyhedral oligomeric silsesquioxane" as used herein refers to an organosilicon compound with the chemical formula [RSiO3/2] that adopts cage-like or polymeric structures with Si—O—Si linkages and tetrahedral Si vertices.

The term "functionalized" as used herein refers to a modification to generate or introduce a new reactive or more reactive group that is capable of undergoing reaction with another molecule.

The term "Diels Alder moiety" as used herein refers to a chemical moiety which can participate in a Diels-Alder [2+4] cycloaddition.

The term "maleimide" as used herein refers to groups with a 2,5-pyrroledione moiety.

The term "dienophile" as used herein refers to a moiety that possesses 2 π-electrons, and which can participate in Diels-Alder cycloaddition reactions. Examples include, but are not limited to, alkenes, alkynes, nitriles, enol ethers, and en-amines.

The term "diene" as used herein refers to a moiety containing two, or at least two, conjugated double bonds, which participate in Diels-Alder cycloaddition reactions.

The term "reversible cross-links" as used herein refers to covalent bonds which form between the first and second siloxane polymers, and upon exposure to thermal energy, for example, the covalent bonds are reversible and can subsequently form new cross-links (cross-linked covalent bonds).

The term "oligomer" as used herein, and as understood in the art, comprises a few monomer units, e.g. less than 100, or in contrast to a polymer that, at least in principle, consists of an unlimited number of monomers. Dimers, trimers and tetramers are oligomers, and may be referred to as one-two or three-mers of monomer.

The term "aryl" as used herein means a monocyclic, bicyclic or tricyclic aromatic ring system containing, depending on the number of atoms in the rings, for example from 6 to 10 carbon atoms, and at least 1 aromatic ring and includes phenyl, naphthyl, 1,2-dihydronaphthyl, 1,2,3,4-tetrahydronaphthyl, indanyl, indenyl and the like.

The term "$(C_1-C_p)$-alkyl" as used herein means straight and/or branched chain, saturated alkyl radicals containing from one to "p" carbon atoms and includes (depending on the identity of p) methyl, ethyl, propyl, isopropyl, n-butyl, s-butyl, isobutyl, t-butyl, 2,2-dimethylbutyl, n-pentyl, 2-methylpentyl, 3-methylpentyl, 4-methylpentyl, n-hexyl and the like, where the variable p is an integer representing the largest number of carbon atoms in the alkyl radical.

The term "$(C_2-C_p)$alkenyl" as used herein means straight or branched chain, unsaturated alkyl groups containing from two to p carbon atoms and one to three double bonds, and includes (depending on the identity of p) vinyl, allyl, 2-methylprop-1-enyl, but-1-enyl, but-2-enyl, but-3-enyl, 2-methylbut-1-enyl, 2-methylpent-1-enyl, 4-methylpent-1-enyl, 4-methylpent-2-enyl, 2-methylpent-2-enyl, 4-methylpenta-1,3-dienyl, hexen-1-yl and the like, where the variable p is an integer representing the largest number of carbon atoms in the alkenyl radical.

The term "$(C_2-C_p)$alkynyl" as used herein means straight and/or branched chain, unsaturated alkyl groups containing from one to n carbon atoms and one or more, suitably one to three, triple bonds, and includes (depending on the identity of p) ethynyl, 1-propynyl, 2-propynyl, 2-methylprop-1-ynyl, 1-butynyl, 2-butynyl, 3-butynyl, 1,3-butadiynyl, 3-methyl but-1-ynyl, 4-m ethylbut-ynyl, 4-m ethylbut-2-ynyl, 2-m ethylbut-1-ynyl, 1-pentynyl, 2-pentynyl, 3-pentynyl, 4-pentynyl, 1,3-pentadiynyl, 1,4-pentadiynyl, 3-methylpent-1-ynyl, 4-methylpent-2-ynyl4-methylpent-2-ynyl, 1-hexynyl and the like, where the variable n is an integer representing the largest number of carbon atoms in the alkynyl group.

Siloxane Elastomers

The present disclosure relates to self-healing siloxane elastomers. In particular, the present disclosure relates to self-healing siloxane elastomers comprising at least one siloxane polymer reversibly crosslinked to a second siloxane oligomer or polymer.

Accordingly, in one embodiment of the disclosure there is included a siloxane elastomer, comprising at least one first siloxane polymer which is functionalized with a first Diels-Alder moiety; and wherein the at least one siloxane polymer is cross-linked with at least one second siloxane oligomer or polymer which is functionalized with two or more of a second Diels-Alder moiety, wherein the first and second Diels-Alder moieties form reversible cross-links.

In one embodiment, the at least one first siloxane polymer is a siloxane having the structure of formula (I)

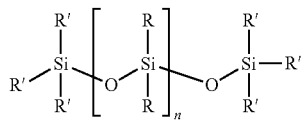
(I)

wherein
each R is independently or simultaneously —$(C_1-C_{10})$-alkyl, —$(C_2-C_{10})$-alkenyl, —$(C_2-C_{10})$-alkynyl, or —$(C_6-C_{10})$-aryl;
each R' is a suitable terminal group, and
n is an integer between 1 and 10,000, and wherein a portion of the R groups are replaced with a group comprising the first Diels-Alder moiety.

In another embodiment, each R is independently or simultaneously is —$(C_1-C_6)$-alkyl, —$(C_2-C_6)$-alkenyl, —$(C_2-C_6)$-alkynyl, or phenyl.

In another embodiment, R' is OH or —$(C_1-C_6)$-alkyl, or $CH_3$.

In one embodiment, the at least one siloxane polymer is a polydimethylsiloxane. In another embodiment, the at least one siloxane polymer is a polydimethylsiloxane functionalized with a first Diels-Alder moiety.

In another embodiment, the first Diels-Alder moiety is a dienophile. In another embodiment, the dienophile is a diene bonded to an electron withdrawing group. In a further embodiment, the dienophile is a maleimide moiety. In a further embodiment, the maleimide moiety has the structure

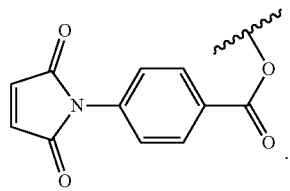 [SMILES: *OC(=O)c1ccc(N2C(=O)C=CC2=O)cc1]

In a further embodiment, the maleimide moiety is

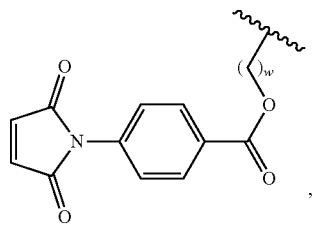

wherein w is an integer between 1 and 10, and

represents the connection to the siloxane polymer.

In another embodiment, the second siloxane is a siloxane oligomer or polymer as defined for the siloxane of the formula (I).

In another embodiment, the second siloxane is a cyclic siloxane, for example, cyclotetrasiloxane, cyclopentasiloxane or cyclohexasiloxane.

In a further embodiment of the disclosure, the second siloxane is a polyhedral oligomeric silsesquioxane. In another embodiment, the polyhedral oligomeric silsesquioxane is functionalized with two or more of a second Diels-Alder moiety, and the remaining silicon atoms are substituted independently or simultaneously with —$(C_1-C_{10})$-alkyl, —$(C_2-C_{10})$-alkenyl, —$(C_2-C_{10})$-alkynyl, or —$(C_6-C_{10})$-aryl.

In another embodiment, the at least one polyhedral oligomeric silsesquioxane is octokis(dimethylsiloxy)-T8-silsesquioxane. In a further embodiment, the octokis(dimethylsiloxy)-T8-silsesquioxane is functionalized with two or more of a second Diels-Alder moiety. In another embodiment, the second Diels-Alder moiety is a reactive diene. In another embodiment, the reactive diene is an acyclic diene, a cyclic diene, or a heterocyclic diene. In another embodiment, the reactive diene is a furan moiety. In another embodiment, the furan moiety has the structure

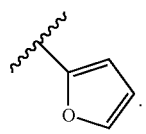

In another embodiment, the furan moiety is

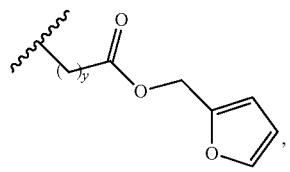

wherein y is an integer between 1 and 10, and

represents the connection to the silsesquioxane.

In another embodiment, the at least one first siloxane polymer has the structure

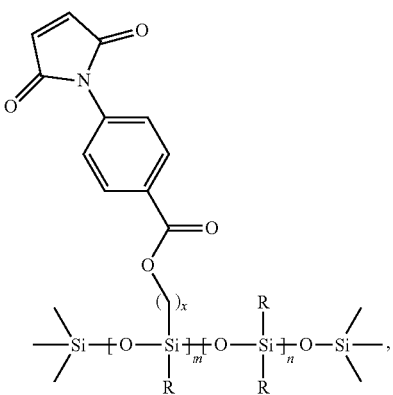

wherein x is an integer between 1 and 10, such as 5;

m represents the molar ratio of the monomer and is between about 0.1 to about 20.0 mol %; and n represents the molar ratio of the monomer and is between about 80.0 to about 99.9 mol %, and R is as defined above (such as $CH_3$).

In another embodiment, the second siloxane is a polyhedral oligomeric silsesquioxane having the structure

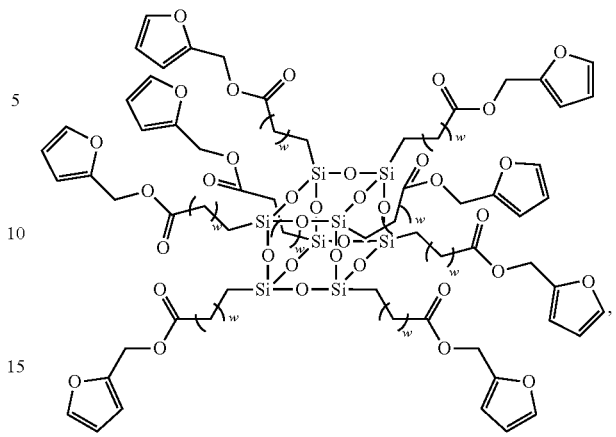

wherein w is an integer between 1 and 10, such as 8.

In further embodiments, the at least one first siloxane polymer, which is functionalized with the first Diels-Alder moiety, is crosslinked to the second siloxane polymer (such as a polyhedral oligomeric silsesquioxane) which is functionalized with two or more of a second Diels-Alder moiety, through a reversible Diels-Alder [2+4] cycloaddition.

In another embodiment, when the first Diels-Alder moiety is a maleimide moiety and the second Diels-Alder moiety is a furan moiety, the reversible cross-link has the structure

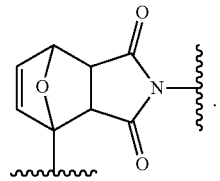 [SMILES: *N1C(=O)C2C3C=CC(*)(O3)C2C1=O]

In further embodiments, the at least one siloxane polymer is a trimethylsilyl terminated copolymer comprising monomeric units of:

a first monomer which is a dimethylsiloxane;

a second monomer, which is formed from a methylhydrosiloxane, wherein the methylhydrosiloxane is functionalized with the first Diels-Alder moiety.

In another embodiment, the dimethylsiloxane has the structure

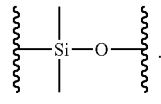

In a further embodiment, the methylhydrosiloxane has the structure

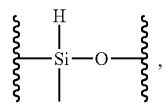

which is converted to a monomer having the structure

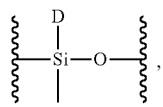

wherein D is a moiety containing the first Diels-Alder moiety, wherein D is

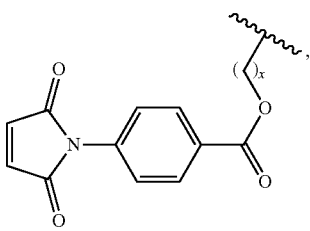

wherein x is an integer from 1-10.

In further embodiments of the disclosure, the at least one siloxane polymer and the at least one polyhedral oligomeric silsesquioxane are heated to a temperature of at least about 60° C., or at least about 70° C. or at least about 80° C. to form the reversible crosslinking bonds between the polymers.

In further embodiments, the siloxane elastomers of the present disclosure are capable of responding to external stimuli, such as thermal and mechanical energies, to heal damaged areas through the reversible cross-links between the siloxane polymer and the polyhedral oligomeric silsesquioxane. In one embodiment, the siloxane elastomer is heated to a temperature of at least about 100° C., or at least about 110° C. to heal damaged portions of the siloxane elastomer. In one embodiment, at elevated temperatures, the crosslinked bonds proceed through a retro Diels-Alder reaction, transiently forming the at least one siloxane polymer which is functionalized with a first Diels-Alder moiety and the least one polyhedral oligomeric silsesquioxane which is functionalized with a second Diels-Alder moiety.

In some embodiments, the elastomers of the present disclosure are useful as coatings, sealants, and elastomer systems where elastomers are useful (O-rings etc).

Although the disclosure has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present disclosure.

The operation of the disclosure is illustrated by the following representative examples. As is apparent to those skilled in the art, many of the details of the examples may be changed while still practicing the disclosure described herein

EXAMPLES

Materials

Celite®545, tetrahydrofuran (THF), toluene, pentane, diethyl ether, aluminium oxide (type WN-6, neutral), molecular sieves (4 Å beads, 8-12 mesh), pyridine, 10-decenoic acid, furfuryl alcohol, 4-aminobenzoic acid, acetic anhydride, sodium acetate, Pt(0)-1,3-divinyl-1,1,3,3-tetramethyldisiloxane complex (Karstedt's catalyst, Pt(dvs)) in xylenes, lipase B from C. antarctica immobilized on Lewatit VPOC1600 cross-linked divinylbenzene resin (Novozym-435, N435), and trimethylsilyl terminated-poly(dimethylsiloxane-co-methylhydrosiloxane) (3-4% methylhydrosiloxane) with an average $M_n$ of 13,000 g/mol (PDMS-1) were obtained from Sigma-Aldrich (Oakville, Ontario, Canada). Maleic anhydride, 4-penten-1-ol, and thionyl chloride were obtained from Alfa-Aesar (Ward Hill, N.J., USA). Heptamethyltrisiloxane and octakis(dimethylsiloxy)-T8-silsesquioxane were obtained from Gelest (Morristown, Pa., USA). All compounds and solvents were used as received unless otherwise noted Instrumentation Mass Spectrometry (MS).

Electron Impact (EI) and Fast Atom Bombardment (FAB) mass spectrometry were carried out on a Thermo DFS high resolution mass spectrometer in positive ion mode. Matrix Assisted Laser Desorption Time of Flight (MALDI-ToF) spectra of 12 was acquired on a Bruker Autoflex MALDI-ToF mass spectrometer in the positive ion mode.

Nuclear Magnetic Resonance (NMR) Spectroscopy.

$^1H$, $^{13}C$, and $^{29}Si$ NMR spectra were acquired using a Bruker AV-300 and AV-400 NMR spectrometer equipped with a PABBO broadband probe. Variable-temperature 1D proton magic angle spinning (MAS) solid-state NMR experiments were performed on a Bruker AV-600 SB spectrometer equipped with a BL4 NMR probe. The spin rate was set to 7 kHz.

Differential Scanning calorimetry (DSC).

Thermal analysis were conducted using a Shimadzu DSC-60 and a TA-60WS thermal analyser. The calorimeter was calibrated using octadecane, which has a melting temperature of 27.95° C. Aluminium was used as the standard.

Scanning Electron Microscopy (SEM).

Samples were mounted onto SEM stubs, sputter-coated with gold and then viewed in a Tescan Vega II LSU scanning electron microscope (Tescan USA, PA) operating at 20 kV.

Infrared Spectroscopy (IR).

Attenuated Total Reflectance Fourier Transform IR (ATR FT-IR) spectra were acquired on a Bruker Alpha Optic GmbH 2012. All spectra were an average of 24 scans at 2 cm$^{-1}$ resolution using neat samples on a diamond window.

Durometer Test.

Shore 00 values were measured using a digital durometer (Check-Line® RX-00) according to ASTM D-2240.

Example 1—Synthesis of Model Compounds

Activated carbon was kept at 120° C. four days before being used. All reactions were performed under a nitrogen atmosphere. THF and pyridine were kept over molecular sieves at least seven days prior to usage.

Synthesis of
5-(1,1,1,3,5,5,5-heptamethyltrisiloxan-3-yl)
pentan-1-ol (3)

To a solution of 4-penten-1-ol (2) (0.91 g, 10.58 mmol) in pentane (14 mL) 1,1,1,3,5,5,5-heptamethyltrisiloxane (1) (2.34 g, 10.56 mmol) was added followed by the addition of Karstedt's catalyst (20 µL). The resulting solution was allowed to reflux for 4 h. Activated charcoal was added to the reaction and the system stirred for 4 h at ambient temperature before being filtered through a pad of Celite® using a medium porosity fritted Büchner funnel. Toluene and any residual starting materials were removed in vacuo to afford 3 exclusively (2.76 g, 9.0 mmol, 85%) as a colourless oil.

$^1$H NMR (400 MHz, CDCl$_3$) δ=3.63 (t, 3J=6.7 Hz, 2H), 1.56 (b, 2H), 1.48 (b, 1H), 1.35 (b, 4H), 0.46 (b, 2H), 0.08 (b, 18H), −0.01 (b, 3H). $^{13}$C NMR (101 MHz, CDCl$_3$) δ=63.02, 32.53, 29.23, 22.92, 17.60, 1.85, −0.29. $^{29}$Si NMR (80 MHz, CDCl$_3$) δ=6.94, −21.50. IR: ν=3330 cm$^{-1}$ (OH). High-Res. MS-EI(+ve): 307.1569 amu. Elemental Analysis (%): Calculated: C: 46.70, H: 10.45, Found: C: 46.41, H: 10.33.

Synthesis of N-[4-(chlorocarbonyl) phenyl] maleimide (4)

The compound was synthesized as previously described.$^{45,46}$ $^1$H NMR (400 MHz, CDCl$_3$) δ=8.23-8.21 (b, 2H), 7.66-7.64 (b, 2H), 6.92 (b, 2H). $^{13}$C NMR (101 MHz, CDCl$_3$) δ=168.59, 167.55, 137.69, 134.61, 132.25, 131.71, 125.15 ppm. High-Res. MS-EI (+ve): 235.0027 amu.

Synthesis of 5-(1,1,1,3,5,5,5-heptamethyltrisiloxan-3-yl) pentyl 4-(2,5-dioxo-2,5-dihydro-1H-pyrrol-1-yl) benzoate (5)

A solution of 3 (0.31 g, 1 mmol) in 5 mL of dried THF was cooled in an ice bath. Pyridine (0.16 g, 2 mmol) was added to the reaction flask and stirred for 10 min. Subsequently, a solution of 4 (0.47 g, 2 mmol) in dried THF (5 mL) was injected in a drop-wise manner into the reaction flask. After 15 h, the crude reaction mixture was diluted with 10 mL THF. The pyridinium salt was filtered through a pad of Celite® using a medium porosity fritted Büchner funnel. After evaporation of the THF in vacuo, the crude mixture was dissolved in 20 mL of pentane to precipitate the excess amount of 4. The suspension was cooled and filtered three times before the pentane was removed in vacuo. After dissolving the resulting viscous liquid in 10 mL toluene, volatiles (including unreacted pyridine) were removed in vacuo to give 5 (0.33 g, 0.65 mmol, 65%) as a brown viscous liquid.

$^1$H NMR (400 MHz, CDCl$_3$) δ=8.15-8.13 (b, 2H), 7.50-7.48 (b, 2H), 6.89 (b, 2H), 4.33 (t, 3J=6.6 Hz, 2H), 1.77 (b, 2H), 1.43 (b, 4H), 0.49 (b, 2H), 0.09 (b, 18H), 0.01 (b, 3H). $^{13}$C NMR (101 MHz, CDCl$_3$) δ=168.94, 165.74, 135.34, 134.36, 130.37, 129.48, 125.18, 65.31, 29.49, 28.48, 22.84, 17.53, 1.87, −0.26. $^{29}$Si NMR (80 MHz, CDCl$_3$) δ=6.97, −21.66. High-Res. MS-EI (+ve): 507.1930 amu. Elemental Analysis (%): Calculated: C: 54.40, H: 7.34, Found: C: 54.19, H: 7.47.

Synthesis of furan-2-ylmethyl undec-10-enoate (8)

10-Undecenoic acid (6) (24 g, 0.13 mol) was dissolved in toluene (160 mL) before the addition of furfuryl alcohol (7) (26 g, 0.26 mol). Enzymatic catalyst N435 (4% w/w, 0.90 g), as well as molecular sieves (2 g), were subsequently added to the reaction flask. After equipping the reaction flask with a Dean-Stark apparatus, the reaction mixture was heated to 85° C. to stir for 48 h. The crude reaction mixture was filtered through a pad of Celite® using a medium porosity fritted Büchner funnel before removal of the solvent using a rotary evaporator. The resulting yellow liquid was dissolved in 50 mL of diethyl ether and washed with 80 mL of distilled water, 40 mL of a saturated solution of NaHCO$_3$, and 30 mL of brine (×3). Combined organic layers were dried over anhydrous Na$_2$SO$_4$ to yield 8 (27 g, 0.10 mol, 78%) as a yellow liquid.

$^1$H NMR (300 MHz, CDCl$_3$) δ=7.42 (b, 1H), 6.40-6.36 (b, 2H), 5.87-5.74 (b, 1H), 5.06 (s, 2H), 5.01-4.91 (b, 2H), 2.32 (t, 3J=7.5 Hz, 2H), 2.04 (b, 2H), 1.62 (b, 2H), 1.38-1.27 (b, 10H). $^{13}$C NMR (75 MHz, CDCl$_3$) δ=173.46, 149.67, 143.18, 139.18, 114.14, 110.53, 110.46, 57.86, 34.14, 33.78, 29.25, 29.04, 28.89, 24.86. High Res. MS-EI (+ve): 264.17 amu. Elemental Analysis (%): Calculated: C: 72.69, H: 9.15, Found: C: 72.80, H: 9.25.

Synthesis of furanyl-2-methyl 11-(1,1,3,3,5,5,5-heptamethyltrisiloxanyl) undecanoate (10)

To a solution of 8 (0.88 g, 3.32 mmol) in toluene (3 mL), Karstedt's catalyst (8 μL) was added and stirred for 10 min. Subsequently, 1,1,3,3,5,5,5-heptamethyltrisiloxane (9) (0.83 g, 3.66 mmol) was introduced to the flask, and the reaction mixture was allowed to reflux for 8 h. Activated charcoal was added to the reaction vessel and the contents were stirred for 2 h at ambient temperature before filtering the suspension through a pad of Celite® using a medium porosity fritted Büchner funnel. Toluene and residual starting material were removed in vacuo to afford 10 (1.36 g, 2.78 mmol, 84%) as a light yellow liquid.

$^1$H NMR (300 MHz, CDCl$^3$) δ=7.42 (b, 1H), 6.40-6.35 (b, 2H), 5.06 (s, 2H), 2.33 (t, $^3$J=7 Hz, 2H), 1.62 (b, 2H), 1.26 (b, 14H), 0.52 (b, 2H), 0.08-0.02 (b, 21H). $^{13}$C NMR (101 MHz, CDCl$^3$) δ=173.50, 149.68, 143.19, 110.54, 110.47, 57.86, 34.17, 33.45, 29.53, 29.49, 29.37, 29.25, 29.11, 24.90, 23.23, 18.30, 1.82, 1.29, 0.22. $^{29}$Si NMR (60 MHz, CDCl$^3$) δ=7.45, 7.01, −21.08. High-Res MS-FAB+: [C23H46O5Si3+Na]$^+$:509.2545 amu. Elemental Analysis (%): Calculated: C: 56.74, H: 9.52, Found: C: 57.01, H: 9.52.

Example 2—Synthesis of Elastomer

Synthesis of pentan-1-ol-siloxane-dimethylsiloxane Copolymers (PDMS-2)

To a solution of PDMS-1 (25 g, 10 mmol Si—H) in toluene (80 mL), 4-pentene-1-ol (2) (1.67 g, 0.02 mol) was added. The solution was allowed to stir for 10 min. Karstedt's catalyst (197 μL) was introduced to the flask, and the reaction was stirred at ambient temperature. Completion of the reaction was confirmed by disappearance of Si—H peak from the $^1$H NMR spectrum. The crude reaction was diluted with 100 mL of toluene. Activated charcoal was added to the reaction vessel and the mixture was left to stir over night at ambient temperature. The suspension was filtered three times through a layered pad of filtration agents, including Celite®, silica, and alumina (2 cm each) using a 150 mL medium porosity fritted Büchner funnel. Toluene and the residual starting materials were removed in vacuo to obtain PDMS-2 (18 g, 7.04 mmol OH) as a slightly yellow, clear, viscous liquid.

$^1$H NMR (300 MHz, CDCl$_3$) δ=3.63 (t, 3J=6.7 Hz, 2H), 1.58 (bm, 2.75H), 1.39 (bm, 4H), 0.54 (bm, 2H), 0.09 (bm, 215H). $^{13}$C NMR (101 MHz, CDCl$_3$) δ=63.02, 32.53, 29.23, 22.92, 17.60, 1.85, −0.29. $^{29}$Si NMR (60 MHz, CDCl$_3$) δ=6.94, −21.50. Elemental Analysis (%): Calculated: C: 33.50, H: 8.27, Found: C: 33.03, H: 8.29.

Synthesis of Maleimidocarboxyphenylpentansiloxane-Dimethylsiloxane Copolymers (PDMS-3)

To a solution of PDMS-2 (16.4 g, 6.4 mmol OH) in 40 mL of dried THF, pyridine (3.1 eq. per mole OH) was added and the reaction was stirred for 15 min. A solution of 4 (3 eq. per mole OH) in 160 mL of dried THF was introduced to the reaction media drop-wise. Completion of the reaction was confirmed by $^1$H NMR when the resonance corresponding to the terminal methylene adjacent to the —OH group at 3.63 ppm was fully shifted to 4.32 ppm. At this point the crude reaction mixture was diluted with 100 mL of THF. The pyridinium salt was filtered from the reaction mixture using a pad of Celite® in a medium porosity fritted Büchner funnel. Upon evaporating the THF, the crude mixture was dissolved in 200 mL of pentane to precipitate any remaining 4. The suspension was cooled and filtered three times prior to evaporating the pentane from the filtrate in vacuo. After dissolving the resulting brownish viscous liquid in 50 mL toluene, the residual amount of unreacted pyridine was removed along with the toluene in vacuo to yield (15.2 g, 1 mmol maleimidocarboxyphenyl) PDMS-3 as a brownish, highly viscous liquid.

$^1$H NMR (300 MHz, CDCl$_3$) δ=8.15-8.12 (b, 2H), 7.50-7.47 (b, 2H), 6.88 (b, 1.66H), 4.32 (b, 2H), 1.78 (b, 2H), 1.45 (b, 4.7H), 0.56 (b, 2H), 0.09 (b, 2 38H). $^{13}$C NMR (101 MHz, CDCl$_3$) δ=168.90, 165.75, 135.29, 134.37, 130.40, 129.55, 125.16, 65.31, 29.58, 28.51, 22.79, 17.41, 1.75, 150, 0.92, 0.52-0.50. $^{29}$Si NMR (60 MHz, CDCl$_3$) δ=7.21, −21.95. Elemental Analysis (%): Calculated: C: 35.89, H: 7.80, Found: C: 34.89, H: 7.90.

Synthesis of octakis(furan-2-ylmethyl)-functionalized Polyhedral Oligomeric Silsesquioxane (12)

To a solution of octakis(dimethylsiloxy)-T8-silsesquioxane (3.25 g, 3.19 mmol) in pentane (50 mL), 8 (6.7 g, 25.36 mmol) was added. The solution was stirred for 10 min. Karstedt's catalyst (25 μL) was introduced to the flask, and the reaction mixture was allowed to reflux for 12 h, ultimately resulting in the appearance of two layers. After extracting the bottom layer, the liquid was dissolved in 50 mL of chloroform. Activated charcoal was added, and the reaction was stirred over night at ambient temperature before filtering the suspension through a pad of Celite® using a medium porosity fritted Büchner funnel. Chloroform was removed in vacuo to obtain 12 (7.14 g, 2.58 mmol, 71%) as a yellow viscous liquid.

$^1$H NMR (300 MHz, CDCl$_3$) δ=7.41 (b, 1H), 6.39-6.34 (b, 2H), 5.05 (s, 2H), 2.32 (t, 3J=7 Hz, 2H), 1.63 (b, 2H), 1.24 (b, 14H), 0.58 (b, 2H), 0.12 (b, 6H). $^{13}$C NMR (101 MHz, CDCl$_3$) δ=173.42, 149.66, 143.16, 110.52, 110.45, 57.83, 34.14, 33.49, 29.63, 29.55, 29.41, 29.30, 29.14, 24.89, 22.98, 17.70, −0.33. $^{29}$Si NMR (60 MHz, CDCl$_3$) δ=12.59, −108.88. MALDI: Theoretical mass of [C$_{144}$H$_{248}$O$_{44}$Si$_{16}$+Na]+: 3152.337 m/z, Measured mass: 3152.363 m/z. Elemental Analysis (%): Calculated: C: 55.21, H: 7.98, Found: C: 55.49, H: 7.96.

Results and Discussion

The components of the model system were synthesized as outlined in Scheme 1.

Scheme 1

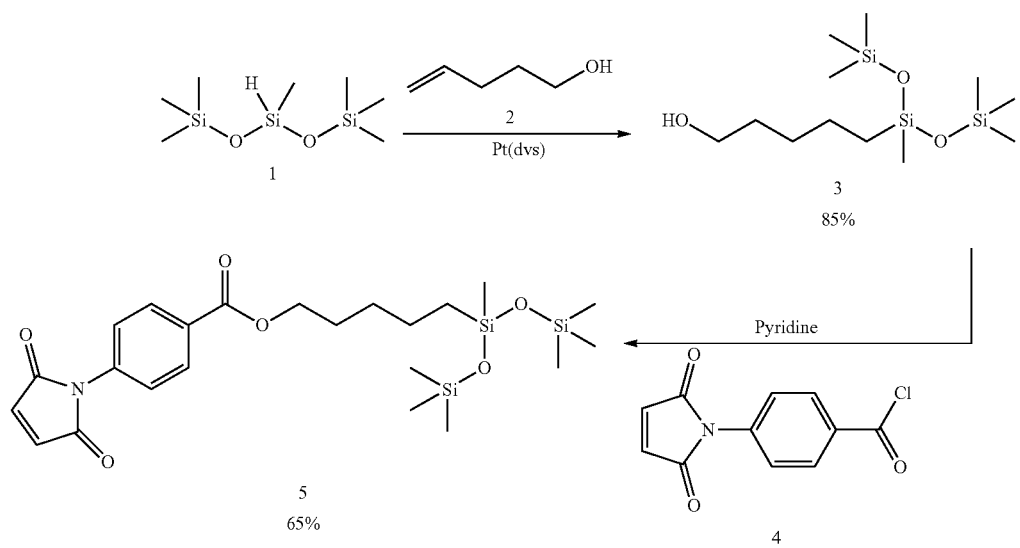

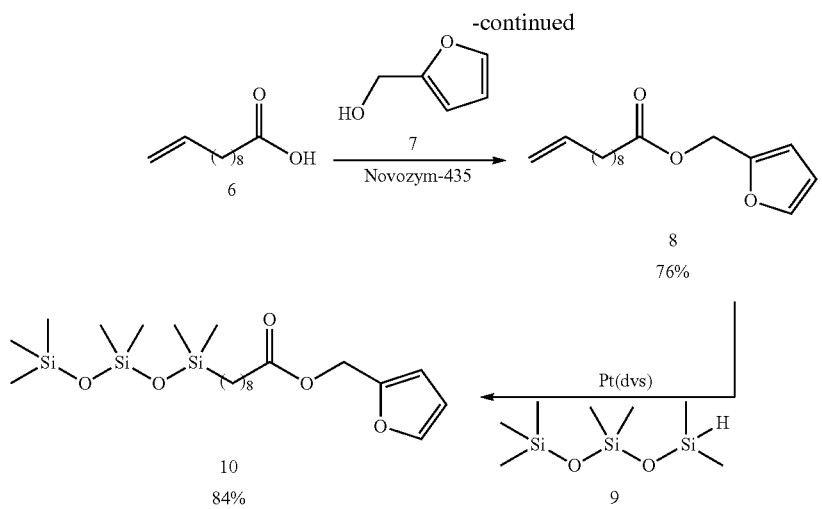

In the model study (FIG. 1), compound 10 and 5 represent the furan-modified POSS (12) and the maleimidocarboxyphenyl pendant group grafted onto PDMS backbones, respectively. The model study was undertaken to characterize the Diels-Alder reaction as it pertained to relatively simple siloxane systems before the Diels-Alder strategy was applied to more complex polymeric matrix. Equimolar amounts of 10 and 5 were reacted without solvent at 40° C.

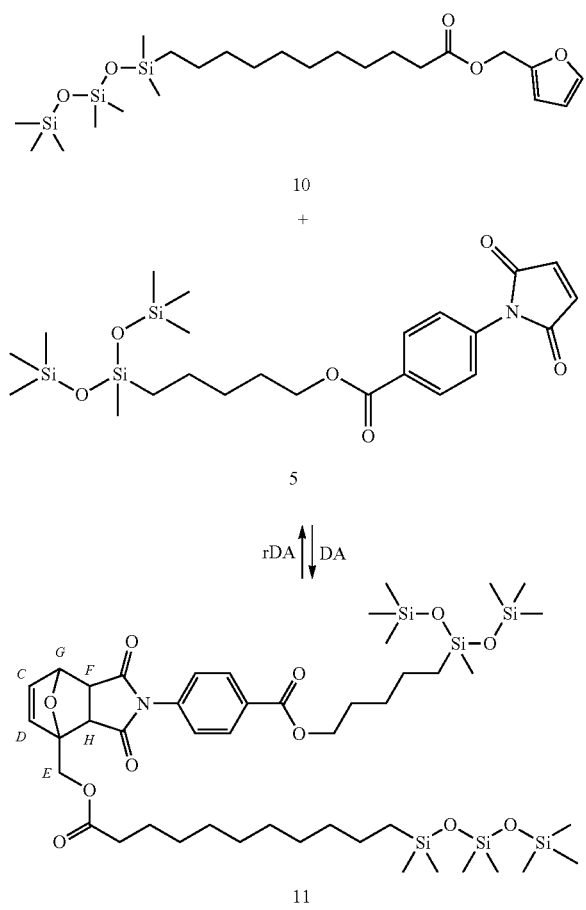

Consumption of the maleimide was confirmed by the disappearance of the maleimide ring-deformation signal at $v=680-700$ cm$^{-1}$ in the ATR-IR spectrum (see ESI). The structure of the model adduct (11) was confirmed principally by $^1$H and gradient $^1$H homonuclear correlation (gCOSY) NMR spectroscopy (see ESI).

In the $^1$H NMR, the resonances associated with the adduct alkene protons were located at 6.48-6.63 ppm, and the resonance for the bridgehead proton (G) was at 5.4 ppm. The relative proportion of endo and exo Diels-Alder products was determined by referencing integral values in the spectrum to the protons of the phenyl ring (8.15-8.13 ppm). Since the dihedral angle between the bridgehead protons and the protons of the exo Diels-Alder adduct is approximately 90°, no observable spin-spin coupling can be observed for these two sets of protons.[20] The protons of the Diels-Alder fused ring systems were assigned as follows: 3.08 ppm (E-exo), 3.16 ppm (F-exo), 3.58 ppm (E-endo), 3.82 ppm (F-endo), 5.41 ppm (G), 6.48 ppm (C), and 6.63 ppm (D), which is in agreement with the data reported for similar compounds.[19,20] Presumably, the steric bulk associated with the siloxane moieties is enough to disrupt the secondary orbital interactions that would favour the formation of the endo adduct, resulting in the exo adduct being the major product, even at relatively low temperatures.

Figure 2:
FIG. 2 shows $^1$HNMR spectra of crosslinked monomers subjected to multiple cycles of heating and cooling.

In order to optimize the conversion of the maleimide to the Diels-Alder adduct (11), the reaction between 10 and 5 was performed at 40° C. (A), 50° C. (B), 60° C. (C), and 80° C. (C) under solvent-free conditions. Each reaction contained 1:1 furan:maleimide mole ratio (12 μL:10 μL) in a small test tube (0.75 ml, 6×50 mm) which was heated at the specified temperature for 24 h. The $^1$H NMR data revealed that the equilibrium is predominantly favorable toward the DA reaction from 40° C. to 50° C. (Table 1, FIG. 2). Extending the time to 48 h for each sample produced approximately the same integral values, addressing that in the first 24 h the model Diels-Alder/retro-Diels-Alder reactions had reached equilibrium conditions (FIG. 2, also see ESI). Consumption of the maleimide was calculated by comparing the integrals of the alkene protons (C, D) with the 2H resonance associated with the phenyl ring at 8.12-8.15 ppm. The relative proportion of endo product decreased significantly as the temperature was increased from 40° C. to 60° C. while the exo adduct became more abundant, suggesting the transition of endo to exo adduct significantly expanded within the mentioned temperature range. However, since the endo and exo adduct ratio has a negligible influence on the bulk properties of a polymeric material, the endo and exo isomers can be treated as a single adduct in terms of the macromolecular chemistry.[11,23]

To study the feasibility of having a system which undergoes multiple Diels-Alder/retro-Diels-Alder cycles, samples A, B, and D were subjected to elevated temperatures of up to 110° C. to facilitate the rDA reaction, prior to cooling down to 50° C. According to the $^1$H NMR data obtained for sample D (FIG. 2), in just 2 h the amount of maleimide conversion altered to 42% from 87% proving the rDA reaction was favored at 110° C., shifting the equilibrium towards the starting materials. Lowering the reaction temperature to 50° C. led to reproduce 99% of the consumed adducts (FIG. 2). Similarly, the reversible reactions for sample A and B were also studied (see ESI). Looking at the data for sample A, the reaction needed less than 2 h at 50° C. to reach its initial equilibrium values. Considering the data from retro-Diels-Alder reaction for sample D at 110° C., the Diels-Alder reaction occurred in a comparable time frame.

A new sample containing almost 96% of the adduct was prepared from equimolar amount of 5 and 10. It was exposed to 136° C. for 2 min before quenching the sample at 4° C. The $^1$HNMR data showed a 66% decline in the amount of adduct available in the sample (see ESI). Considering the thermal behavior of the linkage mentioned, the proposed cross-link was found to be similar to those of which previously described as ultrafast DA/rDA cross-links.[47] It needs to be noted that the diene was unstable at temperatures above 120° C. for extended time periods (i.e., if the diene from retro-Diels-Alder reaction remained at temperatures of 120° C. or greater for several hours, the reaction produced a black solid that was insoluble in conventional solvents). However, this instability did not provide a barrier in terms of the adduct reversibility, as the retro-Diels-Alder reaction occurs within a few minutes. Analogous irreversible reactions have been also reported for furan derivitives.[25,34,41,48-50]

Figure 3:
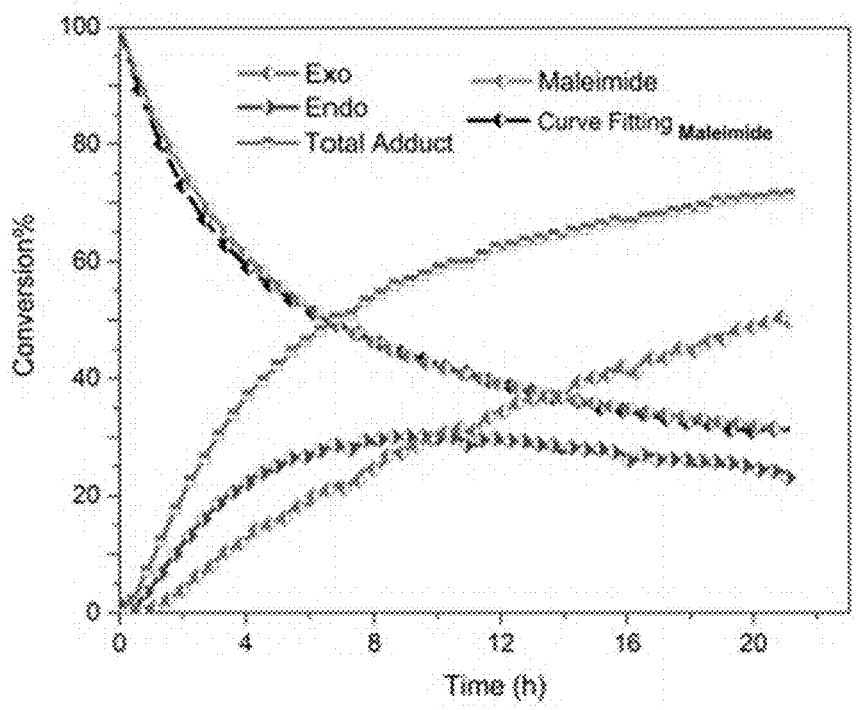
FIG. 3 shows a dynamic $^1$HNMR spectrum of the cross-linking reaction.

In an effort toward understanding of the reaction profile, the Diels-Alder reaction conducted at 50° C. was studied by isothermal $^1$H NMR spectroscopy (FIG. 3). Spectra were acquired every 5 min resulting in 187 total acquisitions. An excess amount of the furan (10 mole equiv.) ($F_0$=10 $M_0$≈0.5 mol/L) in CDCl$_3$ was chosen to establish a pseudo-first-order DA reaction conditions and minimize the reaction time. Curve fitting of the maleimide conversion rate, dx/dt, confirmed the pseudo-first-order rate profile for the DA reaction. In contrast to the exo isomer, which showed relatively linear behaviour through the course of the reaction, the endo adduct was observed to reach its highest concentration in approximately 10 h, reaching a maximum concentration of approximately 30%. Following the reaction from this point, the endo:exo ratio started to increase from 1:1 to 1:2 whereas the endo adduct's amount gradually decreased to 24%. As the Diels-Alder reaction is a balance between the adduct and the starting materials, the maleimide consumption as well as the adduct production was expected to ultimately reach a plateau at the equilibrium state. The forward reaction (Diels-Alder) was almost $k_1/k_2$≈255 L/mol)$^{-2}$ more favorable than the reverse reaction (retro-Diels-Alder) at 50° C. The rate constant for the Diels-Alder reaction at 50° C. ($k_1$) is among the highest values reported for [4π+2π] cycloaddition reactions of furan and maleimide derivatives in the literature.[19,51] The curve fitting formula and constants are as follows $$\text{Diene} + \text{Dienophile} \underset{k_2}{\overset{k_1}{\rightleftarrows}} \text{Adduct}$$

$$\frac{dx}{dt} = (k_1 F_0)(1-x) - (k_2 M_0^{m-1})x^n$$

$$k_1 = 0.4844 \, (h^{-1})(L/\text{mol})$$

$$k_2 = 0.0019 \, (h^{-1})((L/\text{mol}))^{n-1}$$

$$m = 5.2 \times 10^{-5} \approx 0$$

Figure 4:
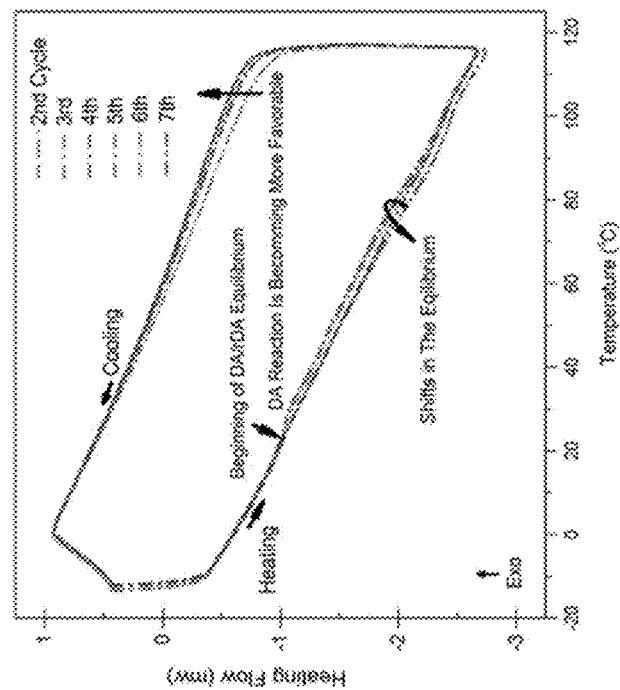
FIG. 4 shows DSC analyses of crosslinked monomers subjected to multiple cycles of heating and cooling.
Figure 4:
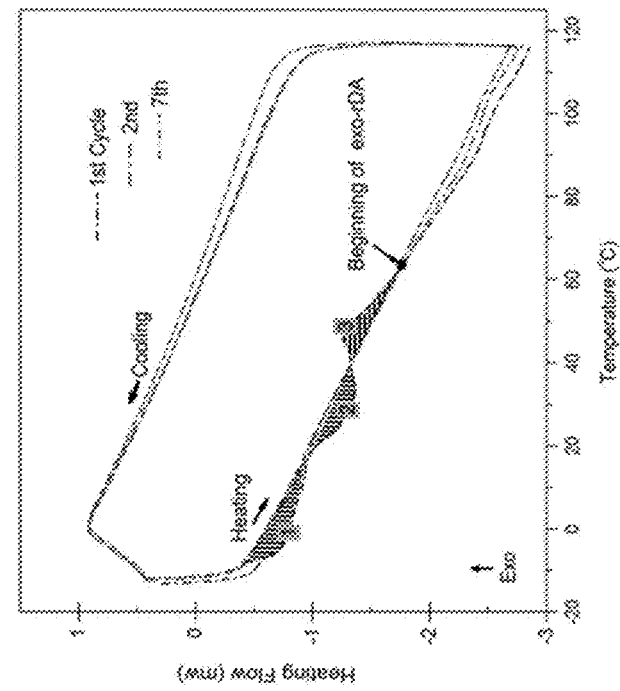

Differential scanning calorimetry (DSC) measurements were also used to visualize the Diels-Alder and retro-Diels-Alder reactions. The sample prepared for DSC analysis was obtained from a 1:1 ratio of diene:dienophile that was kept at 50° C. for 5 days. $^1$H NMR spectroscopy analysis of the sample indicated approximately 88% consumption of the maleimide prior to being analyzed by DSC. The sample was equilibrated at −15° C. for 10 min before being subjected to seven heating/cooling cycles ranging from −13° C. to 116° C. All cycles had the same heating/cooling rate of ±4° C./min. Comparing the first heating/cooling cycle with subsequent ones, there were three conspicuous areas (shaded) in FIG. 4. Reports in the literature[6,19,20,24,33,34,47,48,52,53] as well as the $^1$H NMR data presented above, indicated that the first, second, and third shaded areas can be attributed to the reduction of alignment between the aliphatic carbons bonded to the siloxane moieties (FIG. 4, area 1), the retro-Diels-Alder reaction of the endo isomers (FIG. 4, area 2), and the endo- to exo-isomerization along with crystallization of the exo-adduct before going through the exo-retro-Diels-Alder reaction at approximately 60° C. (FIG. 4, area 3).

It is important to note that there were several parameters governing the material's overall response in the thermal analysis, including the amount of heat injected or extracted from the system by the DSC instrument, the quantity of adduct available, and the isothermal experience at 116° C. in each cycle. The isothermal time periods for the first three cycles, the "4$^{th}$ & 5$^{th}$" and the "6$^{th}$ & 7$^{th}$" cycle were 10, 20, and 40 min, respectively. According to the aforementioned $^1$H NMR experiments the Diels-Alder reaction at 50° C. and the retro-Diels-Alder reaction at 110° C. should be quite comparable over a given time scale in the DSC. However, since the holding time at 116° C. was deliberately extended, the equilibrium tended to shift towards retrieving the amount of adduct that had been consumed. Thus, the exothermic peak gradually increased. Consequently, the Diels-Alder reaction became more favourable in each cooling cycle. Furthermore, none of cycles exhibited an endothermic peak to the same extent as the 1$^{st}$ cycle. This can be attributed to the higher quantity of adduct available in the sample which motivated the equilibrium to favor the retro-Diels-Alder reaction in accordance with Le Châtelier's principle.

The data obtained from the $^1$H NMR and DSC analyses clearly demonstrated the capacity of the cycloaddition linkage to be considered as an intrinsic self-healing cross-link.

Example 4—the Diels-Alder Cross-Linked Siloxane Elastomer

Figure 5:
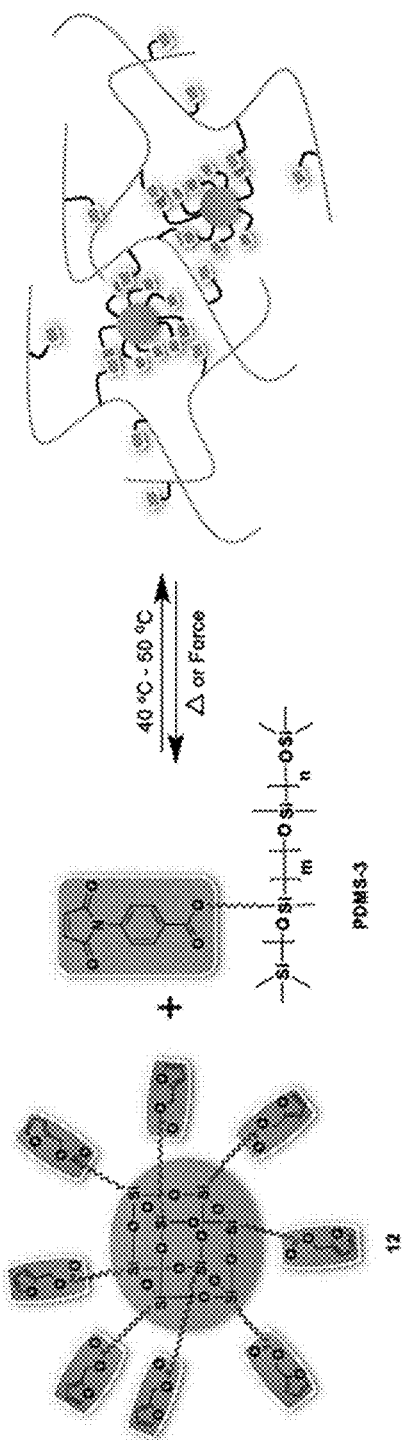
FIG. 5 shows a graphical representation of a cross-linked siloxane elastomer of the disclosure.

The trimethylsiloxy terminated-methylhydrosiloxane-dimethylsiloxane copolymers used in these experiments had a number average molecular weight of 13,000 g/mol and possessed 3-4 mol % of the methylhydrosiloxane. Based on $^1$H NMR data and elemental CH analysis, on average, there was one maleimidocarboxyphenyl side group for every 32 dimethylsiloxane units in the copolymer system. A homogenous solution of PDMS-3 and furan-modified POSS (12) in chloroform with a maleimide:furan mole ratio of 1:3.5 was prepared. The solvent was gradually removed in vacuo before casting the blend into an open poly(tetrafluorethylene) (PTFE) mould with three 37.6×13.8×3 mm cavities. The highly viscous liquid was kept at ambient temperature for 24 h after it was transferred to the cavities. The mould was then placed inside an oven for 2 h at 80° C., followed by 24 h at 50° C. to yield an elastomer (FIG. 5). The material exhibited an average Shore 00 hardness of 74±1.6. As phase separation was not observed, indicating that the POSS diene moieties and siloxane dienophiles were homogeneously dispersed.

Figure 6:
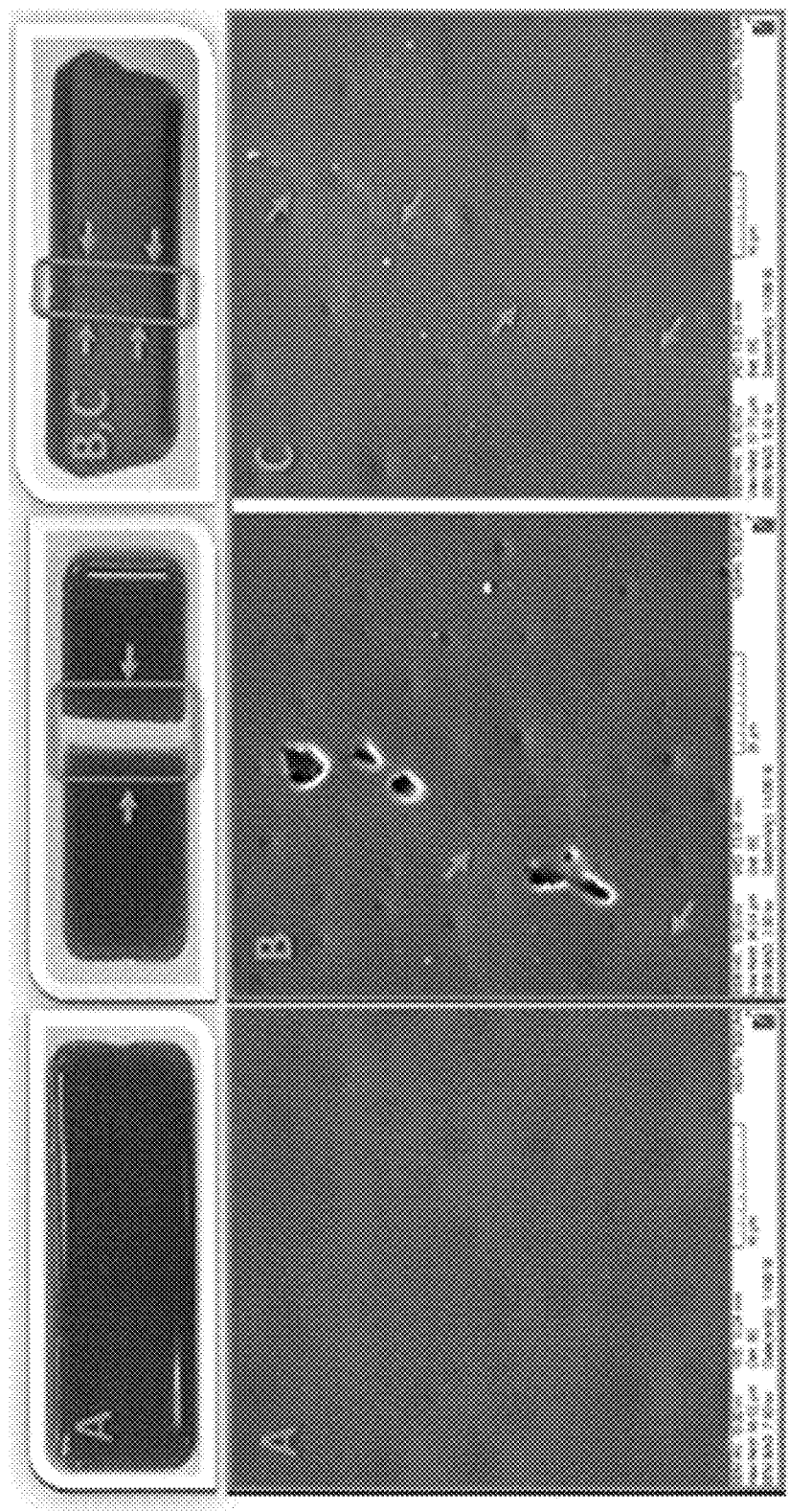
FIG. 6 shows SEM images of a cross-linked siloxane elastomer of the disclosure.
Figure 7:
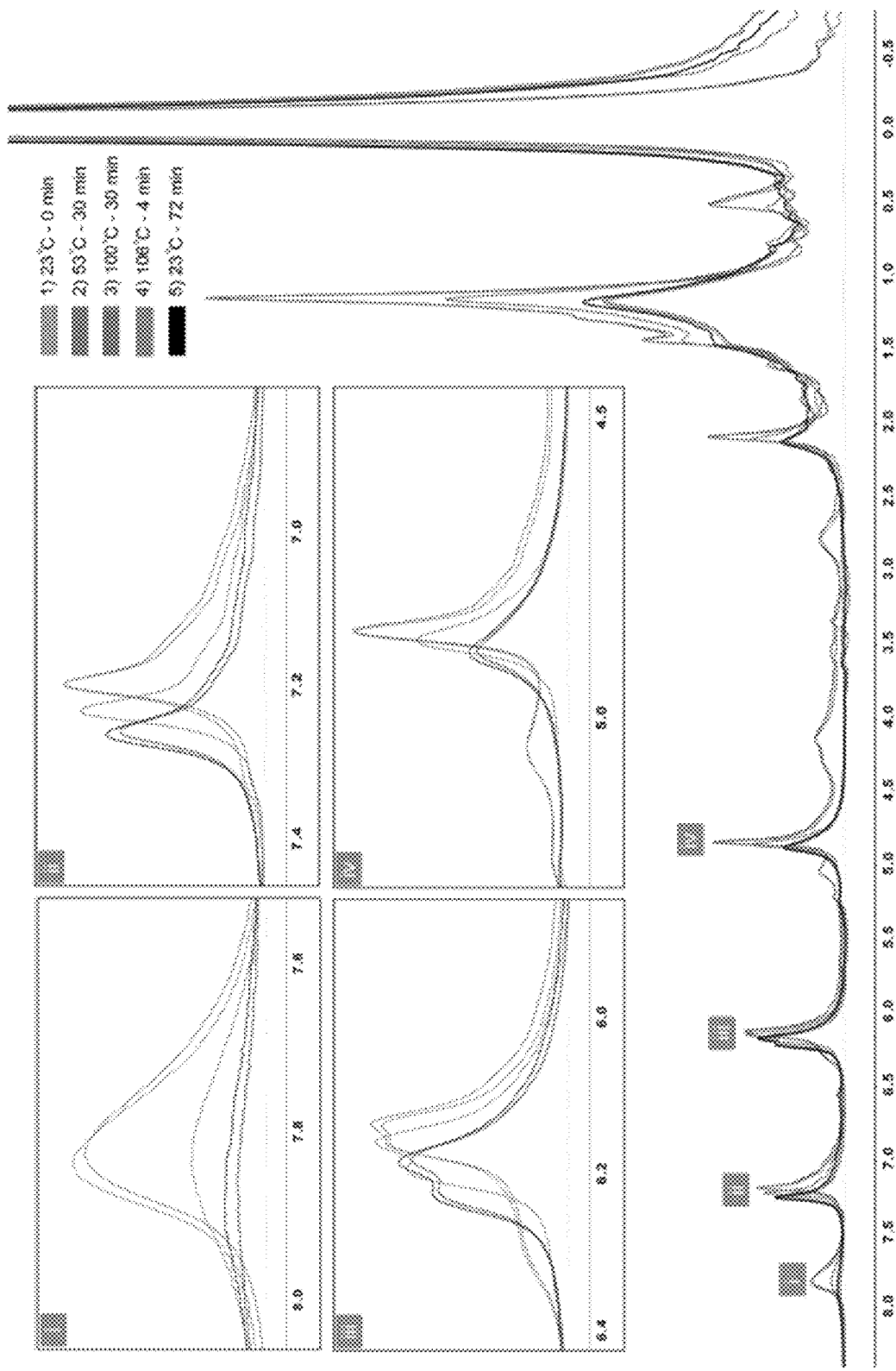
FIG. 7 shows variable-temperature solid-state $^1$HNMR spectra of a cross-linked siloxane elastomer of the disclosure.

Based on the model studies, 110° C. and 50° C. were selected as the optimal temperatures for the retro-Diels-Alder and Diels-Alder reactions in the self-healing process. To assess the self-healing capacity of the network, a specimen was cut completely in half and returned to the mould. Heating the cut elastomer for 2 h at 110° C. prior to 5 h at 50° C. was sufficient to fully rebind the cut pieces (FIG. 6). At elevated temperatures, such as 110° C., the specimen's surfaces became sticky as a result of retro-Diels-Alder reactions. The excess quantity of the diene in the system not only avoided deforming the specimen by suppressing the retro-Diels-Alder reaction, but also helped to efficiently heal the damaged surfaces at 50° C. Retention of the overall integrity of the network at 110° C. can also be attributed to the rigidity of the furan-modified POSS units and the reactivity of its flexible arms. The healed areas were assessed using scanning electron microscopy (SEM) (FIG. 6). Although the cutline was faintly visible after healing, the healed surface exhibited almost a complete recovery. However, there were a number of spots that could not reconnect at the surface due to material loss during the cutting process. Variable temperature solid-state $^1$H NMR analysis of the cross-linked PDMS elastomer provided a further evidence of the thermo-reversibility of cross-links at the molecular level. Although the peaks were heavily overlapped (FIG. 7, i, ii, iii, iv insets), It was possible to observe reversible alterations in their locations as a result of the equilibrium exist among the functional groups. Retro-Diels-Alder and Diels-Alder reactions were detected by increasing the spectrometer temperature to 106° C. prior to decreasing it to ambient temperature (FIG. 7). The spectra showed that the material recovered its initial state once the temperature reached 23° C. The coupling and decoupling reactions within the silicone elastomer were found to occur at same relative rates as observed in the model systems.

To illustrate the material's recyclability and minimize the time needed for the self-healing process, a fully cut specimen was heated to 200° C. The gap between the cut pieces was completely closed as the material subsequently became fluid when the surface temperature crossed 187° C. after 5 minutes. The heater was turned off after the gap closure and the healed specimen was allowed to cool. After an hour from the beginning of the process, the specimen was released from the mould. The material's hardness, shore 00, experienced a ten-unit drop. Although 110° C. was sufficient for the process of healing, 187° C. was the temperature that the material could decouple the cross-links and also could overcome the molecular interactions to behave as a viscous fluid.

The capacity of the Diels-Alder silicon-based linkage to be used for the intrinsic self-healing of silicone-based materials was illustrated through various thermal studies, including $^1$H NMR analysis and DSC measurements. We grafted siloxane chains with a pendant maleimidocarboxyphenyl attached to a five carbon spacer to avoid the limit the rigidity of the bismaleimide while gaining its high reactivity towards the diene. The electronics of the diene and dienophile, along with the flexibility and mobility factors in structural design allowed us to obtain an elastic network exhibiting excellent temperature-controlled self-healing characteristics. The complete reconnection of the two cut pieces in the absence of any solvent was confirmed by SEM. The rigid POSS units and the ratio of maleimide:furan resulted in a material that retained its structural integrity at elevated temperatures without hindering the self-healing process. SEM imaging of the elastomeric samples as well as solid state $^1$H NMR experiments demonstrated the reversible nature of the DA reaction on macroscopic and microscopic scales, respectively. In addition, we have successfully prepared a recyclable elastomeric material exhibiting excellent temperature-controlled self-healing characteristics.

While the present disclosure has been described with reference to what are presently considered to be the preferred examples, it is to be understood that the application is not limited to the examples described herein. To the contrary, the present disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

TABLE 1

The maleimide consumption in sample A, B, C, and D at different temperatures after 24 h.

| Sample | Temperature (° C.) | Maleimide Consumption (%) | Exo(%) |
| --- | --- | --- | --- |
| A | 80 | 74 | 91 |
| B | 60 | 86 | 91 |
| C | 50 | 90 | 82 |
| D | 40 | 87 | 46 |

REFERENCES CITED HEREIN

1 N. K. Guimard, K. K. Oehlenschlaeger, J. Zhou, S. Hilf, F. G. Schmidt and C. Barner-Kowollik, *Macromol. Chem. Phys.*, 2012, 213, 131-143.
2 S. Schäfer and G. Kickelbick, *Polymer*, 2015, 69, 357-368.
3 X.-Y. Jia, J.-F. Mei, J.-C. Lai, C.-H. Li and X.-Z. You, *Chem. Commun.*, 2015, 51, 8928-8930.
4 X. Jia, J. Mei, J. Lai, C. Li and X. You, *Macromol. Rapid Commun.*, 2016, 37, 952-956.
5 Y. Yang, X. Ding and M. W. Urban, *Prog. Polym. Sci.*, 2015, 49-50, 34-59.
6 S. Yu, R. Zhang, Q. Wu, T. Chen and P. Sun, *Adv. Mater.*, 2013, 25, 4912-4917.
7 P. M. Zelisko, H. Y. Amarne, A. D. Bain and K. Neumann, *J. Chem. Educ.*, 2008, 85, 104.
8 A. Gandini, *Prog. Polym. Sci.*, 2013, 38, 1-29.
9 M. A. Tasdelen, *Polym. Chem.*, 2011, 2, 2133.
10 Y.-L. Liu and T.-W. Chuo, *Polym. Chem.*, 2013, 4, 2194.

11 E. Trovatti, T. M. Lacerda, A. J. F. Carvalho and A. Gandini, *Adv. Mater.*, 2015, 27, 2242-2245.
12 T. Engel and G. Kickelbick, in *Self-Healing Polymers*, Wiley-VCH Verlag GmbH & Co. KGaA, Weinheim, Germany, 2013, pp. 153-171.
13 A. Sanyal, *Macromol. Chem. Phys.*, 2010, 211, 1417-1425.
14 P. A. Pratama, M. Sharifi, A. M. Peterson and G. R. Palmese, *ACS Appl. Mater. Interfaces*, 2013, 5, 12425-12431.
15 P. M. Imbesi, C. Fidge, J. E. Raymond, S. I. Cauët and K. L. Wooley, *ACS Macro Lett.*, 2012, 1, 473-477.
16 N. Yoshie, M. Watanabe, H. Araki and K. Ishida, *Polym. Degrad. Stab.*, 2010, 95, 826-829.
17 F. Yu, X. Cao, J. Du, G. Wang and X. Chen, *ACS Appl. Mater. Interfaces*, 2015, 7, 24023-24031.
18 T. N. Gevrek, M. Arslan and A. Sanyal, in *Functional Polymers by Post-Polymerization Modification*, Wiley-VCH Verlag GmbH & Co. KGaA, Weinheim, Germany, 2013, pp. 119-151.
19 V. Froidevaux, M. Borne, E. Laborbe, R. Auvergne, A. Gandini and B. Boutevin, *RSC Adv.*, 2015, 5, 37742-37754.
20 J. Canadell, H. Fischer, G. De With and R. A. T. M. van Benthem, *J. Polym. Sci. Part A Polym. Chem.*, 2010, 48, 3456-3467.
21 E. Goiti, M. B. Huglin and J. M. Rego, *Macromol. Rapid Commun.*, 2003, 24, 692-696.
22 R. Araya-Hermosilla, G. Fortunato, A. Pucci, P. Raffa, L. Polgar, A. A. Broekhuis, P. Pourhossein, G. M. R. Lima, M. Beljaars and F. Picchioni, *Eur. Polym. J.*, 2016, 74, 229-240.
23 T. Engel and G. Kickelbick, *Chem. Mater.*, 2013, 25, 149-157.
24 C. Zeng, H. Seino, J. Ren, K. Hatanaka and N. Yoshie, *Polymer*, 2013, 54, 5351-5357.
25 T. Engel and G. Kickelbick, *Eur. J. Inorg. Chem.*, 2015, 2015, 1226-1232.
26 C. Zeng, H. Seino, J. Ren, K. Hatanaka and N. Yoshie, *Macromolecules*, 2013, 46, 1794-1802.
27 Y. Yang and M. W. Urban, *Chem. Soc. Rev.*, 2013, 42, 7446.
28 S. J. Garcia, *Eur. Polym. J.*, 2014, 53, 118-125.
29 J. Zhao, R. Xu, G. Luo, J. Wu and H. Xia, *J. Mater. Chem. B*, 2016, 4, 982-989.
30 L. M. Polgar, M. Van Duin, A. A. Broekhuis and F. Picchioni, *Macromolecules*, 2015, 48, 7096-7105.
31 Y. Heo and H. A. Sodano, *Adv. Funct. Mater.*, 2014, 24, 5261-5268.
32 E. Goiti, M. B. Huglin and J. M. Rego, *Polymer*, 2001, 42, 10187-10193.
33 K. Roos, E. Dolci, S. Carlotti and S. Caillol, *Polym. Chem.*, 2016, 7, 1612-1622.
34 C.-I. Chou and Y.-L. Liu, *J. Polym. Sci. Part A Polym. Chem.*, 2008, 46, 6509-6517.
35 Y. Imai, H. Itoh, K. Naka and Y. Chujo, *Macromolecules*, 2000, 33, 4343-4346.
36 C. Vilela, L. Cruciani, A. J. D. Silvestre and A. Gandini, *RSC Adv.*, 2012, 2, 2966.
37 S. H. Cho, H. M. Andersson, S. R. White, N. R. Sottos and P. V. Braun, *Adv. Mater.*, 2006, 18, 997-1000.
38 M. D. Hager, P. Greil, C. Leyens, S. van der Zwaag and U. S. Schubert, *Adv. Mater.*, 2010, 22, 5424-5430.
39 M. W. Keller, S. R. White and N. R. Sottos, *Adv. Funct. Mater.*, 2007, 17, 2399-2404.
40 R. Gheneim, C. Perez-Berumen and A. Gandini, *Macromolecules*, 2002, 35, 7246-7253.
41 Z. Xu, Y. Zhao, X. Wang and T. Lin, *Chem. Commun.*, 2013, 49, 6755.
42 H. Zhou, Q. Ye and J. Xu, *Mater. Chem. Front.*, 2017.
43 D. R. Paul and J. E. Mark, *Prog. Polym. Sci.*, 2010, 35, 893-901.
44 K. Pielichowski, J. Njuguna, B. Janowski and J. Pielichowski, in *Advances in Polymer Science*, 2006, vol. 201, pp. 225-296.
45 J. O. Park and S. H. Jang, *J. Polym. Sci. Part A Polym. Chem.*, 1992, 30, 723-729.
46 C. B. Patel, N. I. Malek and S. L. Oswal, *J. Macromol. Sci. Part A*, 2006, 43, 289-303.
47 Y. Zhang, A. A. Broekhuis and F. Picchioni, *Macromolecules*, 2009, 42, 1906-1912.
48 J. P. Swanson, S. Rozvadovsky, J. E. Seppala, M. E. Mackay, R. E. Jensen and P. J. Costanzo, *Macromolecules*, 2010, 43, 6135-6141.
49 H. Laita, S. Boufi and a. Gandini, *Eur. Polym. J.*, 1997, 33, 1203-1211.
50 S. A. Canary and M. P. Stevens, *J. Polym. Sci. Part A Polym Chem.*, 1992, 30, 1755-1760.
51 A. Gandini, D. Coelho and A. J. D. Silvestre, *Eur. Polym. J.*, 2008, 44, 4029-4036.
52 C. Gaina, O. Ursache and V. Gaina, *Polym. Plast. Technol. Eng.*, 2011, 50, 712-718.
53 C. Goussé and A. Gandini, *Polym. Int.*, 1999, 48, 723-731.

The invention claimed is:

1. A siloxane elastomer, comprising
a) at least one siloxane polymer which is functionalized with a first Diels-Alder moiety; and
wherein the at least one siloxane polymer is cross-linked with at least one second siloxane oligomer or polymer which is functionalized with two or more of a second Diels-Alder moiety,
wherein the first and second Diels-Alder moieties form reversible cross-links,
and wherein the first Diels-Alder moiety is

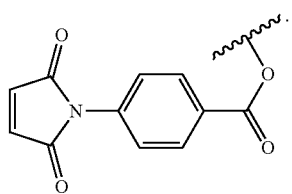 [SMILES: *OC(=O)c1ccc(N2C(=O)C=CC2=O)cc1]

2. The siloxane elastomer of claim 1, wherein the at least one siloxane polymer is a siloxane having the structure

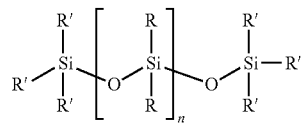

wherein
each R is independently or simultaneously $(C_1-C_{10})$-alkyl, $(C_2-C_{10})$-alkenyl, —$(C_2-C_{10})$-alkynyl, or —$(C_6-C_{10}$-aryl;
each R' is a suitable terminal group, and
n is an integer between 1 and 10,000,
and wherein a portion of the R groups are replaced with a group comprising the first Diels-Alder moiety.

3. The siloxane elastomer of claim 2, wherein R' is OH or —(C1-06)-alkyl.

4. The siloxane elastomer of claim 1, wherein the at least one siloxane polymer is polydimethylsiloxane.

5. The siloxane elastomer of claim 1, wherein the second siloxane is a siloxane oligomer or polymer as defined in claim 2, a cyclic siloxane or a polyhedral oligomeric silsesquioxane.

6. The siloxane elastomer of claim 5, wherein the cyclic siloxane is cyclotetrasiloxane, cyclopentasiloxane or cyclohexasiloxane.

7. The siloxane elastomer of claim 5, wherein the polyhedral oligomeric silsesquioxane is functionalized with two or more of a second Diels-Alder moiety, and the remaining silicon atoms are substituted independently or simultaneously with —($C_1$-$C_{10}$)-alkyl, —($C_2$-$C_{10}$)-alkenyl, —($C_2$-$C_{10}$)-alkynyl, or —($C_6$-$C_{10}$)aryl.

8. The siloxane elastomer of claim 7, wherein the polyhedral oligomeric silsesquioxane is octokis(dimethylsiloxy)-T8-silsesquioxane.

9. The siloxane elastomer of claim 1, wherein the second Diels-Alder moiety is a reactive diene.

10. The siloxane elastomer of claim 9, wherein the reactive diene is an acyclic diene, a cyclic diene, or a heterocyclic diene.

11. The siloxane elastomer of claim 10, wherein the reactive diene is a furan moiety.

12. The siloxane elastomer of claim 1, wherein the at least one first siloxane polymer has the structure

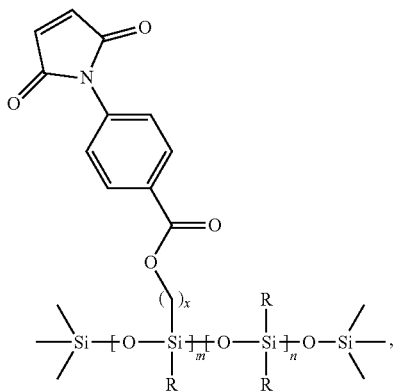

wherein x is an integer between 1 and 10;
m represents the molar ratio of the monomer and is between about 0.1 to about 20.0 mol %; and
n represents the molar ratio of the monomer and is between about 80.0 to about 99.9 mol %,
and R is as defined in claim 2.

13. The siloxane elastomer of claim 1, wherein the second siloxane has the structure

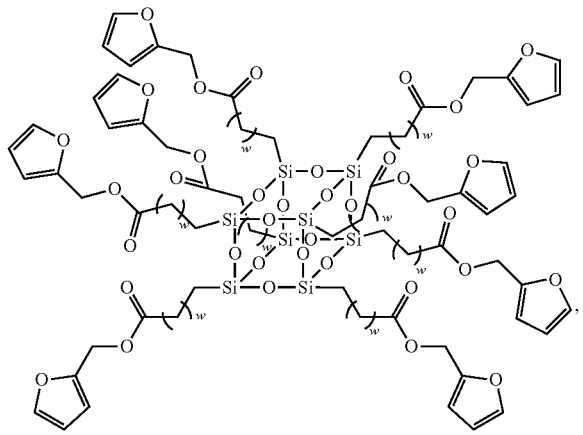

wherein w is an integer between 1 and 10.

14. The siloxane elastomer of claim 1, wherein the reversible cross-link has the structure

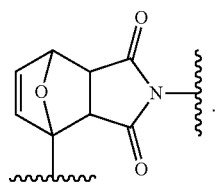 [SMILES: *N1C(=O)C2C3C=CC(*)(O3)C2C1=O]

15. The siloxane elastomer of claim 1, wherein the at least one first siloxane polymer is a trimethylsilyl terminated copolymer comprising:
a) dimethylsiloxane units, and
b siloxane units comprising
i) a methyl group;
ii) a group functionalized with a Diels-Alder moiety, wherein the Diels-Alder moiety has the structure

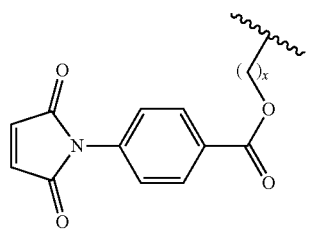

wherein x is an integer from 1-10.

* * * * *